Oct. 6, 1964
S. L. CALGARY
3,151,539
COFFEE MAKER
Filed April 17, 1963
2 Sheets-Sheet 1
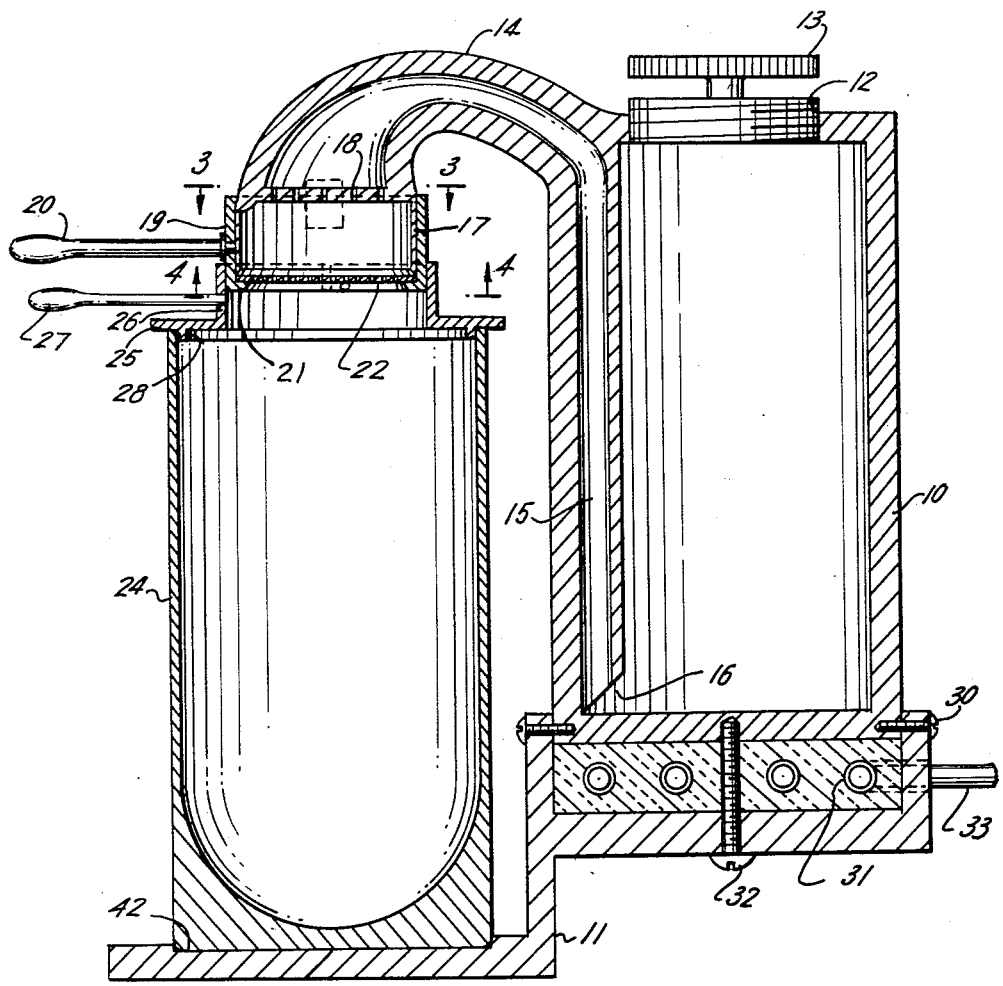
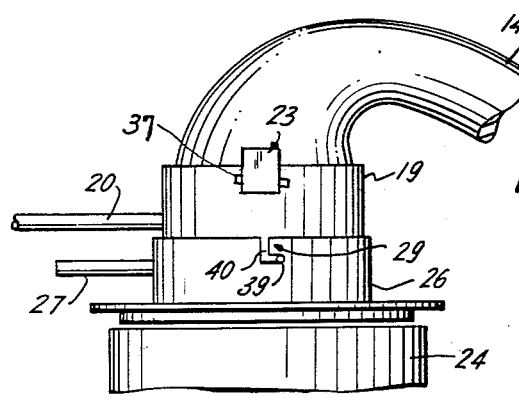
INVENTOR.
STEVEN L. CALGARY
BY Clark Ott
ATTORNEYS Oct. 6, 1964 S. L. CALGARY 3,151,539
COFFEE MAKER
Filed April 17, 1963 2 Sheets-Sheet 2
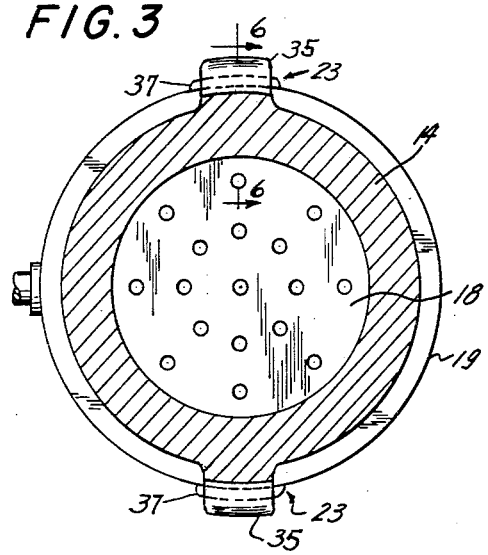
FIG. 3
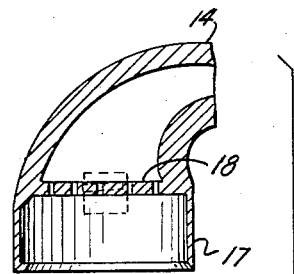
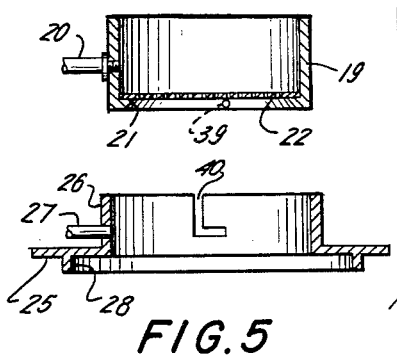
FIG. 5
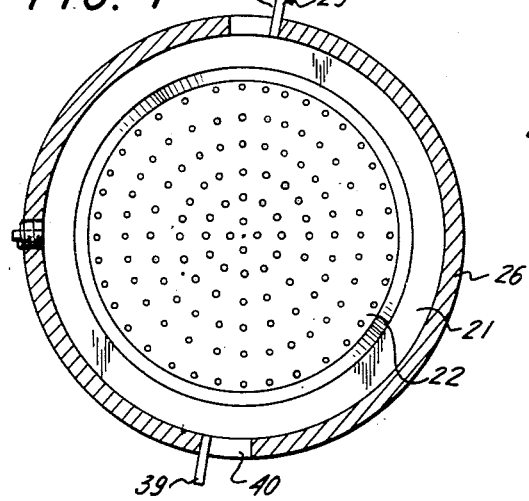
FIG. 4
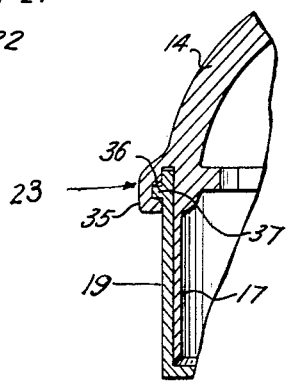
FIG. 6
INVENTOR.
STEVEN L. CALGARY
BY Clark & Ott
ATTORNEYS United States Patent Office 3,151,539
Patented Oct. 6, 1964

3,151,539
COFFEE MAKER
Steven L. Calgary, 2508 Broadway, New York 25, N.Y.
Filed Apr. 17, 1963, Ser. No. 273,783
5 Claims. (Cl. 99—315)

This invention relates to a coffee maker for brewing coffee from powdered or ground roasted coffee beans and, while not limited thereto, the invention has particular reference to a coffee maker for use in motor vehicles for brewing coffee while travelling.

An object of the invention is to provide a coffee maker for brewing coffee without subjecting the brewed coffee to continued boiling during the heating and boiling of the water.

Another object of the invention is to provide a coffee maker in which the heated water is discharged downwardly to percolate through ground or pulverized coffee and the brewed coffee drips into a cup positioned therebelow on the coffee maker.

Another object of the invention is to provide a receptacle for the ground or pulverized coffee which is releasably connected with a downwardly directed water discharge neck whereby the receptacle may be conveniently filled with the ground or pulverized coffee and expeditiously removed therefrom for refilling or cleaning.

Still another object of the invention is to provide a cover for the coffee cup which retains the cup in position on the coffee maker and which is removably connected with the receptacle for the ground or pulverized coffee.

Still another object of the invention is to provide a coffee maker with a base containing an electrical heating element adapted to be connected with a source of current for heating the brewing water and which base also serves for supporting the coffee cup in position for receiving the brewed coffee as the same drips from the ground or pulverized coffee.

With the aforegoing and other objects in view, reference is now made to the accompanying specification in which the preferred embodiment of the invention is illustrated.

In the drawings:

FIG. 1 is a vertical sectional view of a coffee maker constructed in accordance with the invention.

FIG. 2 is a fragmentary side view of the hot water discharge spout, the container for the ground or pulverized coffee bean, and showing the upper portion of the coffee receiving container together with the cover therefor.

FIG. 3 is an enlarged transverse sectional view taken approximately on line 3—3 of FIG. 1.

FIG. 4 is a similar view taken approximately on line 4—4 of FIG. 1.

FIG. 5 is a sectional view of the parts shown in FIG. 2 of the drawings and showing the same in separated juxtaposition.

FIG. 6 is an enlarged fragmentary sectional view taken approximately on line 6—6 of FIG. 3.

Referring to the drawings, the coffee maker includes a container 10 mounted on a base 11 and having an opening 12 in the top thereof for receiving water for brewing the coffee. The said opening is closed by a screw cap 13 which seals the opening for the build up of pressure in the container during the heating of the water.

The container is formed with a discharge neck 14 which is in communication with a flow passageway 15 located within the container at one side thereof and which flow passageway is open at its lower end 16 adjacent the bottom wall of the container. The neck 14 is downturned at its outer end which is enlarged and is formed with a peripheral wall portion 17 and with a foraminated plate 18 located above said peripheral wall portion. Adapted to be removably mounted on the peripheral wall portion 17 is a receptacle 19 which is of a cross-sectional configuration corresponding to that of said peripheral wall portion and is adapted to receive ground or pulverized coffee through which percolates the steam and hot water discharged through the neck 14 by the pressure created in the container 10. The receptacle 19 is provided with a handle 20 and is formed with an inturned bottom flange 21 on which a strainer 22 is removably supported having closely spaced minute apertures which permits of the flow of the brewed coffee therethrough but which prevents the escape of the ground or pulverized coffee. Interengageable latch means 23 later described in detail are provided on the peripheral walls of the receptacle 19 and the neck 14 for releasably supporting the receptacle thereon and which permits of the convenient removal of the receptacle for filling the same with the ground or pulverized coffee and the removal thereof for inserting a fresh supply and for cleaning the same.

The brewed coffee is adapted to be discharged into a cup 24 of any desired character preferably provided with a flat bottom wall for supporting the same on the base 11 and which fittingly engages a cover 25 having an upstanding peripheral flange 26 provided with a handle 27 and which flange is adapted to slidably engage the lower peripheral portion of the receptacle 19. The cover 25 is also provided with a depending peripheral flange 28 which is adapted to engage within the cup 24 to prevent spilling of the brewed coffee as the same percolates through the ground or pulverized coffee and drains into the cup. The cover 25 and the receptacle 19 is formed with interengageable means 29 later described in detail for releasably fastening the cover on said receptacle.

The container 10 is affixed to the base 11 by screws 30 or other fastening means and between the base and the bottom wall of the receptacle, an electrical heating element 31 is arranged which is secured in position by a screw 32 or other means and with the heating element embedded within ceramic or other insulation and heat resistant material. The ends 33 of the heating element protrude through the base for connection with a source of current supply such as the electrical system of the vehicle for heating the water.

The interengageable latch means 23 are provided on opposite side portions of the neck 14 and receptacle 19 and each includes a lip 35 projecting outwardly from the neck 14 which is formed with an inclined groove 36 on the inner face thereof. The receptacle 19 is formed with an inclined rib 37 adapted to be cammed into the inclined groove 36 with the rotation of the receptacle to thereby removably secure the receptacle in position thereon. The interengageable means 29 are formed on opposite side portions of the receptacle 19 and cover 25 and each includes a pin 39 projecting outwardly from the said receptacle which is adapted to engage an L-shaped slot 40 in the flange 26 of the cover and by rotation of the cover the pins 39 are disposed at the inner ends of said slots for removably retaining the cover on the receptacle. With the pins 39 located in the top of the slots 40, the cover 25 snugly fits over cup 24, the depending flange 28 being fully disposed therewithin. If it is desired to remove the cup from the assembly it is merely necessary to lift up and slightly turn the cover 25 by means of the handle 27 so that the cover is suspended on the pins 39 thus affording sufficient space between the cover and the cup to permit the latter to be removed from the base. See FIGURE 2.

The base 11 is formed with a recess 42 in the upper face thereof adapted to fittingly receive the bottom portion of the cup 24 for retaining the same in position thereon for receiving the brewed coffee.

While the preferred form of the invention is shown and described herein, it is to be understood that the invention is not so limited but shall cover and include any and all modifications thereof which fall within the purview of the invention.

What is claimed is:

1. In a coffee maker, a container having a top opening and a cap for closing said opening and having a discharge passageway with an inlet adjacent the bottom wall thereof and which passageway extends upwardly in the container and through a downwardly directed neck connected with the container at the upper end thereof, said neck having an annular wall portion at the outer end thereof spaced from said container, a receptacle for receiving ground or pulverized coffee beans, said receptacle being provided with a handle member and snugly receiving said annular wall portion therein and having a strainer forming the bottom wall thereof, interengageable means carried by said neck and said receptacle removably mounting said receptacle on said neck, a base to which said container is affixed, said base having an electrical heating element embedded therein and with terminals for connection with a source of current supply for heating water in said container to thereby create pressure within the container for the discharge of water through said passageway and downwardly through the ground or pulverized coffee beans in said receptable, said base extending under said receptacle for supporting a cup for receiving the brewed coffee as the same drips from said receptacle, and a cover having a handle member and a depending rim adapted to engage within the upper end of said cup, and interengageable means carried by said cover and said receptacle removably mounting said cover on said receptacle beneath said strainer.

2. In a coffee maker, a container having a discharge passageway with an inlet adjacent the bottom wall thereof, said passageway extending through a neck connected with the container and with the outer end thereof directed downwardly and forming a cylindrical wall portion, a receptacle for receiving ground or pulverized coffee, said receptacle being provided with a handle member and snugly receiving said cylindrical wall portion therein and having a strainer forming the bottom wall thereof, interengageable means carried by said neck and said receptacle removably mounting said receptacle on said neck, a base to which said container is affixed, said base having an electrical heating element embedded therein and with terminals for connection with a source of current supply for heating water in said container to thereby create pressure within the container for the discharge of water through said passageway and downwardly through the ground or pulverized coffee in said receptacle, said base extending under said receptacle for supporting a cup for receiving the brewed coffee as the same drips from said receptacle, and a cover having a handle member and removably connected with said receptacle for retaining said cup in position on said base.

3. In a coffee maker, a container having a discharge passageway with an inlet adjacent the bottom wall thereof and which passageway extends upwardly in the container and through a downwardly directed neck connected with the container at the upper end thereof, a receptacle for receiving ground or pulverized coffee, said receptacle having a strainer forming the bottom wall thereof, interengageable means carried by said neck and said receptacle removably mounting said receptacle on the outer end of said neck, a base to which said container is affixed, said base having an electrical heating element embedded therein and with terminals for connection with a source of current supply for heating water in said container to thereby create pressure within the container for the discharge of heated water through said passageway and downwardly through the ground or pulverized coffee in said receptacle, said base extending under said receptacle for supporting a cup for receiving the brewed coffee as the same drips from said receptacle, and a cover removably connected with said receptacle for retaining said cup in position on said base.

4. In a coffee maker, a container for boiling water, a tubular neck connected with said container adjacent the top thereof and with the outer end of the neck directed downwardly and through which hot water is forced by pressure created in the container by the boiling of the water, a receptacle for receiving ground or pulverized coffee removably connected with said neck and having a strainer forming the bottom wall thereof, a base to which said container is affixed, said base having an electrical heating element embedded therein and with terminals for connection with a source of current supply for heating the water in said container, and a cover removably connected with said receptacle adapted to engage over a cup for receiving the brewed coffee as the same drips from said receptacle.

5. In a coffee maker, a container for boiling water, a hot water discharge pipe connected with said container adjacent the top thereof and extending downwardly into the container with an inlet adjacent the bottom thereof and with the outer end thereof protruding from the container and directed downwardly and through which hot water is forced by pressure created in the container by the boiling of the water, a receptacle for receiving ground or pulverized coffee removably connected with the outer end of said pipe and having a strainer in the bottom wall thereof, a base to which said container is affixed, said base having an electrical heating element with terminals for connection with a source of current supply for heating the water in said container, said base extending to one side of said container for supporting a cup below said receptacle, and a cover removably connected with said receptacle adapted to engage over said cup for receiving the brewed coffee as the same drips from said receptacle.

References Cited in the file of this patent

FOREIGN PATENTS

| | | |
|---|---|---|
| 140,967 | Australia | Apr. 27, 1951 |
| 325,796 | Switzerland | Jan. 15, 1958 |
| 616,773 | Great Britain | Jan. 26, 1949 |